United States Patent
Poucher et al.

[15] 3,659,418
[45] May 2, 1972

[54] VARIABLE GAS TURBINE ENGINE AIR INTAKE

[72] Inventors: Michael Poucher, Duffield; Michael Roy Williams, Filton, both of England

[73] Assignee: Rolls-Royce Limited, Derby, England

[22] Filed: July 13, 1970

[21] Appl. No.: 54,124

[30] Foreign Application Priority Data

July 30, 1969 Great Britain.....................38,150/69

[52] U.S. Cl.............................60/39.29, 60/269, 137/15.1, 138/39, 415/DIG. 1
[51] Int. Cl. ...........................................F02c 7/04
[58] Field of Search .................60/39.29, 269; 137/13, 15.1, 137/81.5; 138/39; 415/DIG. 1

[56] References Cited

UNITED STATES PATENTS

| 2,841,182 | 7/1958 | Scala | 60/39.65 |
|---|---|---|---|
| 2,957,306 | 10/1960 | Attinello | 415/DIG. 1 |
| 3,000,401 | 9/1961 | Ringleb | 138/39 |
| 3,123,285 | 3/1964 | Lee | 137/81.5 |
| 3,285,501 | 11/1966 | McDonald | 415/DIG. 1 |
| 3,300,121 | 1/1967 | Johnson | 415/DIG. 1 |
| 3,430,640 | 3/1969 | Lennard | 137/15.1 |
| 3,508,561 | 4/1970 | Cornish | 137/81.5 |
| 3,524,458 | 8/1970 | Goldsmith | 137/15.1 |

Primary Examiner—Douglas Hart
Attorney—Cushman, Darby & Cushman

[57] ABSTRACT

A vortex air flow is set up around the outer fringe of an air flow through a duct, the internal diameter of which increases in a downstream direction. The vortex picks up the outer fringe of the air flow in the duct and causes it to diffuse more rapidly onto the increased diameter portion of the duct, than would normally occur.

7 Claims, 4 Drawing Figures

VARIABLE GAS TURBINE ENGINE AIR INTAKE

The present invention relates to diffusing ducts for fluid flows and has particular reference to diffusers in which the fluid flow is stabilized by means of vortices.

According to the invention a diffusing fluid flow duct comprises an upstream wall portion and a downstream wall portion with a discontinuity therebetween, means adjacent the discontinuity for promoting the formation of a vortex which forms a moving fluid wall between said wall portions and which circulates in a direction such as to promote attachment of a fluid flow leaving the upstream wall portion onto the downstream wall portion.

The vortex may be an artificially generated forced vortex or may be a freely generated vortex.

In one embodiment of the invention the diffusing duct forms a part of an air intake duct of a gas turbine engine and the discontinuity is formed by at least one flap member which may be moved radially of the duct axis to decrease the flow area of the intake.

In a second embodiment of the invention the diffusing duct is formed between the final compressor stage and the combustion chamber of a gas turbine engine. In this embodiment the discontinuity occurs between the upstream portion of the diffusing duct which receives air from the last stage of the compressor, and the casing surrounding the combustion chamber.

The means promoting the formation of a vortex comprises at least one annular, downstream-facing concave member extending across the discontinuity and into which part of the expanding fluid flow will break away to form a vortex. Preferably one concave member is provided on each side of the diffuser extending respectively from the upstream portion of the diffuser to the radially outer and inner casings of the combustion chamber respectively.

The invention will now be more particularly described, merely by way of example with reference to the accompanying drawings in which.

Figure 1:
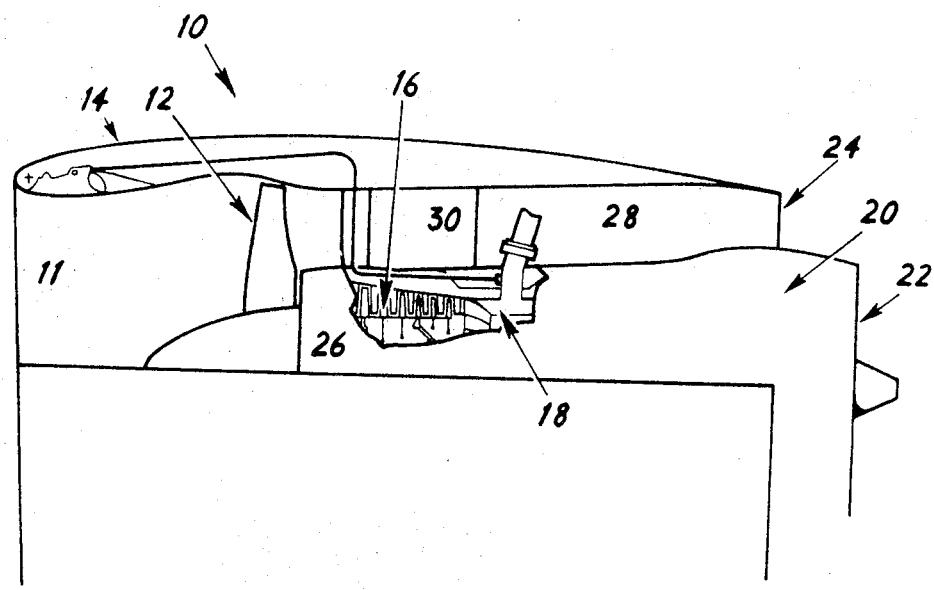
FIG. 1 is a diagrammatic elevation of a gas turbine engine in which the invention has been incorporated.

In FIG. 1 a gas turbine engine of the ducted fan type is indicated generally by the numeral 10. The engine comprises, in flow series, an air intake 11, a fan stage 12 surrounded by a cowl 14, a compressor 16, combustion equipment 18, an expansion turbine (not shown) and an exhaust duct 20 which terminates in a hot gas exhaust nozzle 22.

Cowl 14 also terminates in an exhaust nozzle 24, which nozzle exhausts fan air.

As can be seen in FIG. 1, fan blades 12 extend radially beyond a casing 26 which encloses the hot gas producing portion of engine 10, into a duct 28 formed between cowl 14 and engine casing 26. Cowl 14 and engine casing 26 are maintained in spaced-apart relationship by a plurality of fixed struts 30 equi-angularly spaced about the engine axis.

It is well known in the art that when fan 12 is rotated, ambient air is sucked through air intake 11 and forced by fan 12 through duct 28, to be finally expelled from nozzle 24. Passage of the air between the blades of fan 12 results in wakes being formed in the airflow, said wakes starting at the trailing edges of the fan blades. The wakes extend downstream and collide with the leading edges of the struts thereby creating noise pulses which rebound from the strut leading edges and pass upstream, back through the fan blades and out of intake 11.

Figure 2:
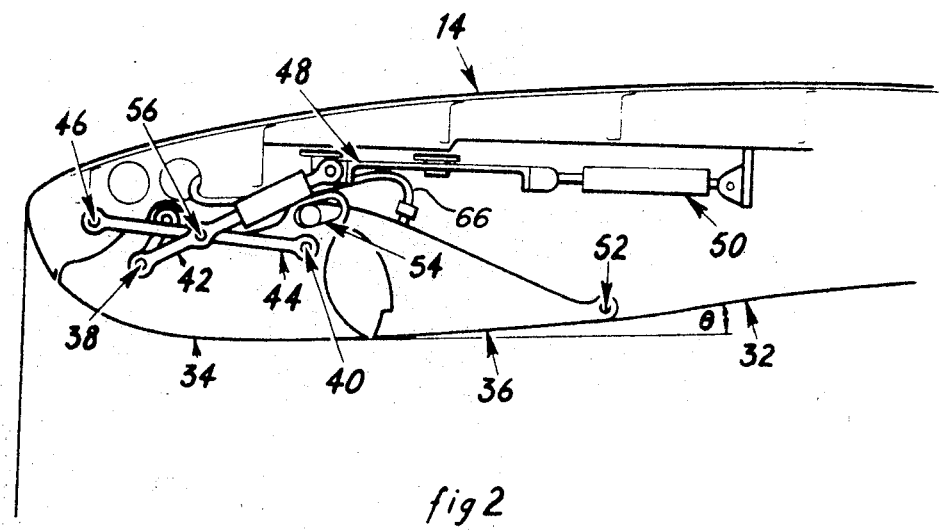
FIGS. 2 and 3 are enlarged views of one half of the intake of the engine of FIG. 1 showing the invention applied to the intake.
Figure 3:
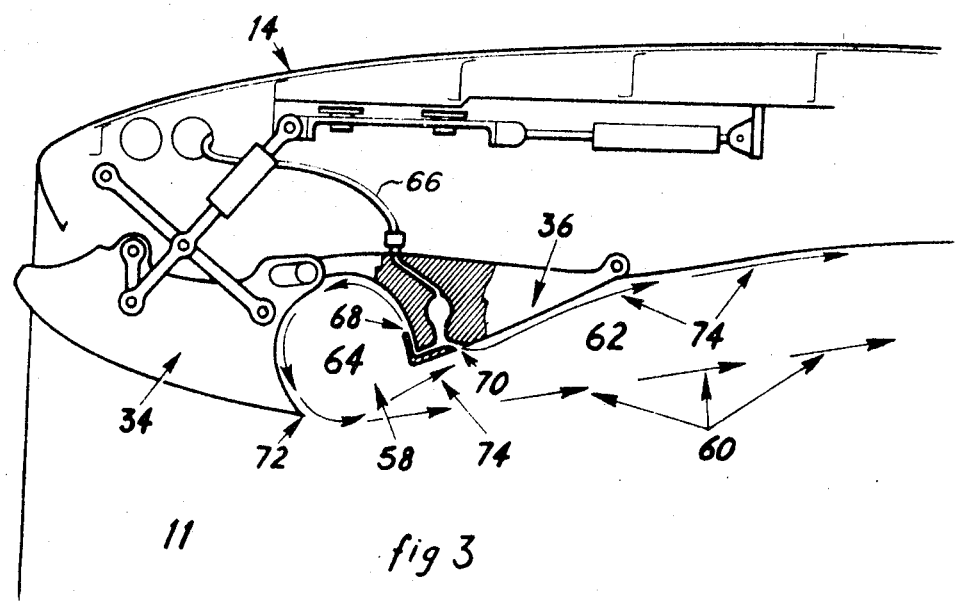

In order to reduce the volume of noise issuing from the intake 11, the upstream end of the intake is constructed so as to permit variation of the cross-sectional area of the intake throat by way of reduction thereof and so increase the velocity of the airflow through the throat. Thus as seen in FIGS. 2 and 3, the fan cowl 14 comprises a double walled structure, the inner wall 32 of which comprises, at its upstream end, a plurality of pairs of flaps 34 and 36, each pair being aligned axially of the engine.

Flaps 34 are each suspended at two points 38 and 40 respectively, which points are pivotally connected to the ends of a pair of links 42 and 44. The other end of link 44 is pivotally attached to the inside of cowl 14 at 46 and the other end of link 42 is pivotally attached to an axially moveable member 48. Member 48 achieves its axial movement via the action of a ram mechanism 50 fixed to cowl 14.

Flaps 36 each have a simple pivot connection 52 to the inside of cowl 14. However, flaps 34 and 36 are connected to each other by a pin and slot arrangement 54. Thus when rotation of the intake throat cross-sectional area is required, ram 50 is caused to extend and, in so doing, pushes link 42 in an upstream direction. Link 42 is pivotally connected at 56 to link 44 and so causes link 44 to pivot about the axis of joint 46 and so moves flap 34 from the position shown in FIG. 2, to the position shown in FIG. 3. The slot and pin connection 54 allows flap 34 to move and, at the same time, causes flaps 36 to pivot about the axis of joint 52 so that, on completion of flap movement to the throat area reduction position of FIG. 3, there is, at most, a small break in the intake wall. This break is indicated by the numeral 58.

A problem which is created by throat area reduction in this manner, is that the design diffusion angle of the intake wall is increased. The diffusion angle is that angle to the engine axis at which the air spreads out on its way to the fan or compressor face, after passing the throat plane and, in FIG. 2 is represented by the Greek letter $\theta$. The arrows 60 in FIG. 3 indicate the fringe of the main intake airflow after passing the reduced throat, the fringe being well away from the intake wall due to movement of the flaps with consequent separation.

As can be seen in FIG. 3 an area of low pressure 62 is thus formed and the intake air tends to break away at its fringes and fill this area with a turbulent flow which extends right to the fan or compressor face, further aggravating noise and vibrational problems and resulting in an overall pressure loss through the engine.

In order to maintain the airflow adjacent the intake wall while flaps 34 and 36 are in their operative positions, the adjacent ends of said flaps are formed so that they form between them a substantially toroidal shaped cavity 64, one part of which is in communication with the air intake 11. An air tapping is taken from a position downstream of compressor 16 and led, via a conduit 66 to a pair of nozzles 68 and 70 in each of flaps 36. Nozzle 68 directs some of the tapped air around the wall of the toroid and off the lip 72 of flap 34. Thus a vortex is formed by the tapped air swirling around in space 64. As the air swirls off lip 72 it merges with and picks up the fringe of the main intake airflow, causing it to diffuse at a much steeper angle to the engine axis than angle $\theta$ and thus causes the intake air to contact the intake wall at a position well upstream of the fan or compressor, as indicated by arrow 74. The early contact of the air with the intake wall obviates breakaway and turbulence thereof and so, in turn, does not aggravate the existing noise and vibration problems mentioned heretofor.

Nozzles 70 direct the remainder of the tapped air onto the intake wall, in a downstream direction, so as to provide in effect, a moving wall for the intake air to pass along towards the fan, thus reducing the scrubbing action of the air against the static wall, which reduction assists in maintaining the intake air velocity right up to the fan.

Figure 4:
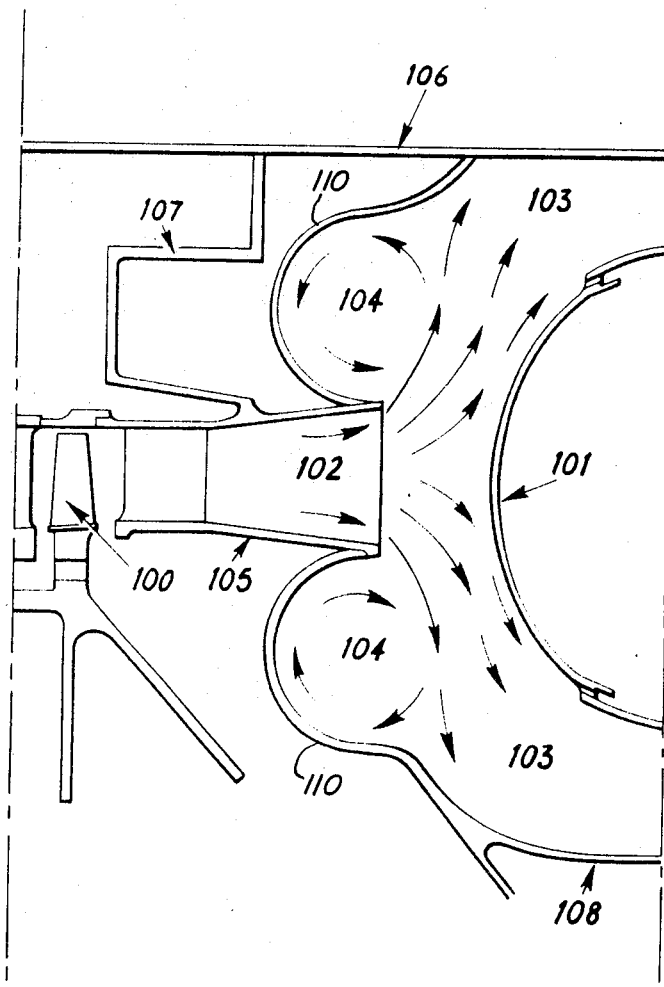
FIG. 4 is an enlarged view of a diffusing duct incorporating the invention between the compressor and combustion chamber of the engine.

Referring now to FIG. 4 there is shown the diffusing diffusing section of the gas turbine engine between the last stage 100 of the compressor and the combustion chamber 101.

The diffusing duct is annular and comprises an upstream portion 102 and downstream portions 103 with discontinuities 104 therebetween.

The upstream portion 102 comprises a single annular member 105 which is supported from the engine outer casing 106 by a support structure 107. The downstream portion 103 which comprises two annular portions, is formed between the upstream end of the combustion chamber 101 and the radially outer and radially inner casings 106 and 108.

Fluid flow passing down the upstream portion 102 would tend to break up at the discontinuity and produce turbulence. The discontinuity is therefore bridged by a downstream facing concave annular wall 110 which is shaped to pick up the breaking flow and guide part of it into a vortex flow pattern in the discontinuity. The vortex then acts as a fluid wall the shape of which varies with the varying flow velocities of different engine running conditions and promotes a more stable fluid flow across the discontinuity.

This arrangement is preferable to inserting a shaped wall for guiding the fluid flow across the discontinuity because the wall would be the correct shape only for one particular running condition of the engine. The vortex size and shape however varies with the pressures and velocities of the fluid under different conditions and maintains a fluid wall of more nearly the correct shape under off-design conditions and reduces pressure losses in the flow.

We claim:

1. A gas turbine engine comprising: an air intake, compressor means, combustion equipment and turbine means in flow series, said air intake having at least one diffusing fluid flow duct for flow of fluid therethrough and said duct comprising an upstream wall portion and a downstream diverging wall portion adapted to be spaced therefrom to define a discontinuity therebetween, said upstream wall portion and downstream diverging wall portion being formed by pairs of flap members, each pair of said flap members being adjacent axially of the duct with each other and hinged so as to be moveable to reduce said ducts width relative to its width downstream of the upstream wall portion and downstream diverging wall portion, means defining a toroidal cavity between said upstream wall portion and said downstream diverging wall portion, said toroidal cavity being adapted to be open to said discontinuity between said upstream wall portion and said downstream diverging wall portion, and means for promoting a fluid vortex in said toroidal cavity to define a variable shaped fluid wall across said discontinuity, said fluid vortex circulating in a direction to impinge upon and promote attachment of fluid flowing in said duct leaving the upstream wall portion onto the downstream wall portion without breakaway and turbulence along said downstream diverging wall portion.

2. A gas turbine engine as claimed in claim 1 wherein adjacent edges of each pair of flap members include structure defining a portion of said toroidal cavity when said flap members are moved to a position reducing width of said duct.

3. A gas turbine engine as claimed in claim 2 wherein the fluid flowing in said air intake has an angle of diffusion of its outer layers which is increased by impingement thereon of fluid from said fluid vortex when said flap members are moved to said width reducing position.

4. A gas turbine engine as claimed in claim 2 wherein said means for promoting the fluid vortex in said toroidal cavity includes an air tapping conduit extending from a source of compressed air and opening at least to said toroidal cavity.

5. A gas turbine engine as claimed in claim 4 including nozzle means also connected to said tapping conduit for directing some of the air along the downstream diverging wall portion to provide a moving wall there along.

6. A gas turbine engine as claimed in claim 2 including means to provide a moving fluid wall along said diverging downstream wall portion between the same and outer layers of the fluid flowing in said duct.

7. A gas turbine engine as claimed in claim 6 in which said last mentioned means includes nozzle means operatively connected to a source of compressed air.

* * * * *